United States Patent [19]

Trumbull et al.

[11] Patent Number: 5,124,840
[45] Date of Patent: * Jun. 23, 1992

[54] PORTABLE VIEWING APPARATUS

[76] Inventors: Donald E. Trumbull, 20867 Exhibit Pl., Woodland Hills, Calif. 91367; Louis Lichtenfield, 8360 Sunset View Dr., Los Angeles, Calif. 90069

[ * ] Notice: The portion of the term of this patent subsequent to Jun. 30, 2009 has been disclaimed.

[21] Appl. No.: 728,975

[22] Filed: Jul. 12, 1991

Related U.S. Application Data

[63] Continuation-in-part of Ser. No. 363,540, Jun. 8, 1989.

[51] Int. Cl.⁵ .............. G02B 27/24; G03B 21/00; H04N 13/00
[52] U.S. Cl. .................. 359/472; 358/88; 358/91; 359/471; 359/473; 359/480; 359/668
[58] Field of Search .......... 359/472, 480, 482, 462, 359/466, 471, 473, 669, 668; 358/88, 91

[56] References Cited

U.S. PATENT DOCUMENTS

| | | | |
|---|---|---|---|
| 1,349,018 | 8/1920 | Terashima | 350/137 |
| 2,289,521 | 7/1942 | Rose | 352/57 |
| 2,380,088 | 7/1945 | Trickell | 350/135 |
| 2,413,996 | 1/1947 | Ransdell | 352/60 |
| 3,160,889 | 12/1964 | Giacometti | 352/60 |
| 3,187,339 | 6/1965 | Clay | 352/61 |
| 3,357,770 | 12/1967 | Clay | 350/131 |
| 3,425,775 | 10/1969 | Jacobsen | 350/420 |
| 3,482,908 | 12/1969 | McCormick | 352/38 |
| 3,502,401 | 3/1970 | Thompson | 352/69 |
| 3,551,036 | 12/1970 | Bielusici | 352/60 |
| 3,891,313 | 6/1975 | Murphy | 350/132 |
| 4,168,885 | 9/1979 | Kent et al. | 352/60 |
| 4,235,503 | 11/1980 | Condon | 350/132 |
| 4,436,369 | 3/1984 | Bukowski | 350/130 |
| 4,509,832 | 4/1985 | Jacobsen | 350/420 |
| 4,523,226 | 6/1985 | Lipton et al. | 358/91 |
| 4,525,045 | 6/1985 | Fazekas | 352/57 |
| 4,555,168 | 11/1985 | Meier et al. | 353/7 |

FOREIGN PATENT DOCUMENTS 59-30390  2/1984  Japan .................. 358/91

*Primary Examiner*—Scott J. Sugarman
*Attorney, Agent, or Firm*—Pretty, Schroeder, Brueggemann & Clark

[57] ABSTRACT

A viewing apparatus for use in providing either a three-dimensional image when used to view a side-by-side display on a conventional video screen of related left and right images that are each horizontally compressed, or alternatively for use in providing a wide-angle image when used to view a single horizontally compressed image displayed on a conventional video screen. In providing the three-dimensional image, the apparatus transmits the displayed left image to the viewer's left eye and the displayed right image to the viewer's right eye, while horizontally expanding the compressed images and returning them to their original, natural porportions. The displayed side-by-side images both extend along the screen's entire vertical length, such that a three-dimensional effect is provided having the same two-dimensional proportions as the conventional video screen. In providing the wide-angle image, the apparatus transmits the single horizontally-compressed image to the viewer's two eyes, while horizontally expanding the image to return it to its original, natural porportions.

11 Claims, 2 Drawing Sheets

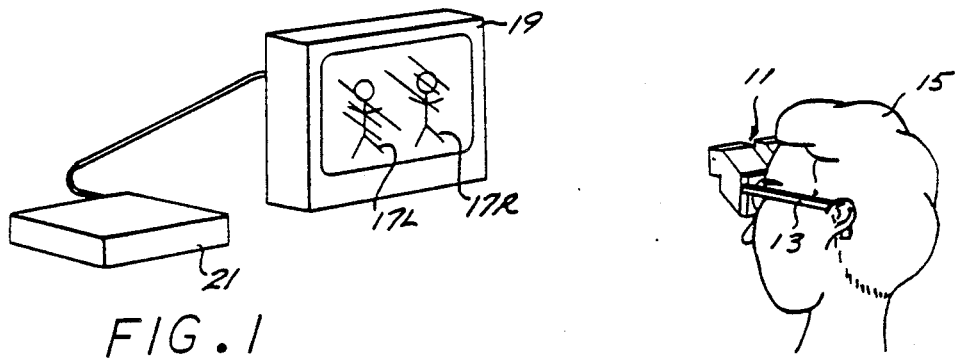
FIG. 1
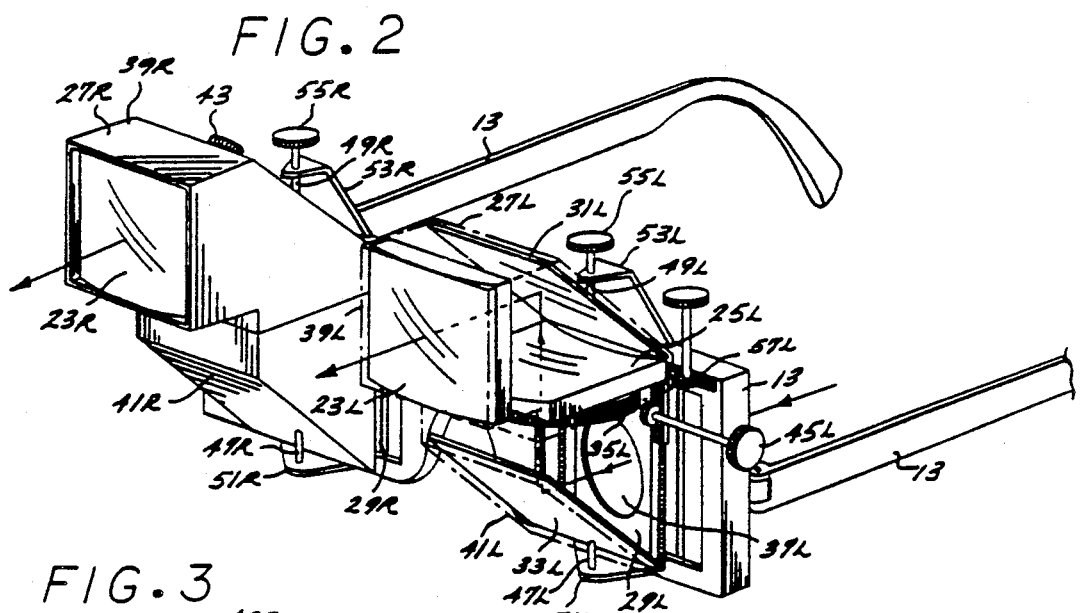
FIG. 2
FIG. 3
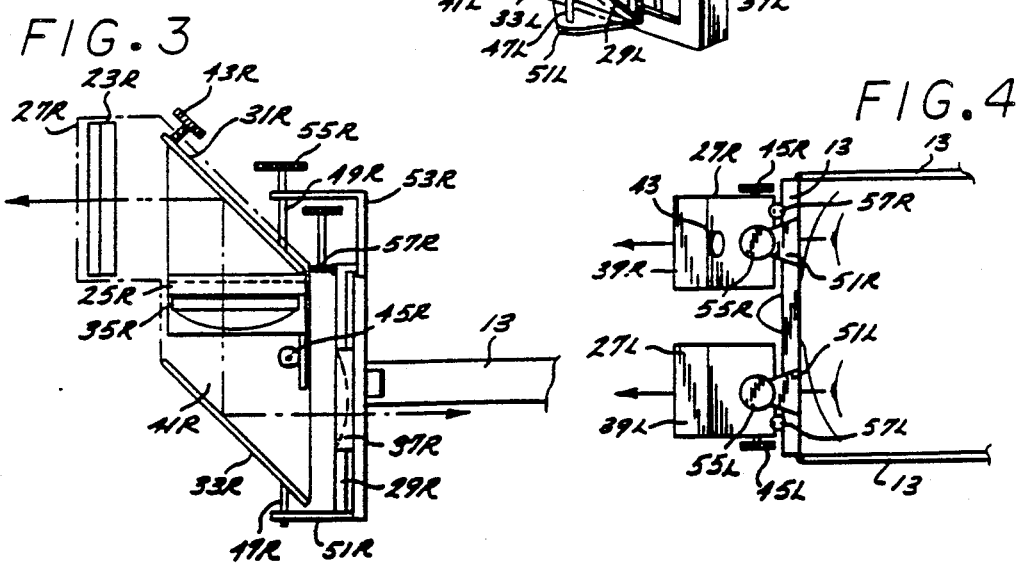
FIG. 4

PORTABLE VIEWING APPARATUS

CROSS-REFERENCE TO RELATED APPLICATION

This is a continuation-in-part of application Ser. No. 07/363,540, filed Jun. 8, 1989 and entitled "Portable Stereoscopic Viewing Apparatus."

BACKGROUND OF THE INVENTION

1. Field of the Invention

This invention relates generally to portable viewing apparatus useful in providing its user with enhanced images and, more particularly, to apparatus that can provide a stereoscopic or three-dimensional image when a first kind of program material is being viewed and that can provide a wide-angle image when a second kind of program material is being viewed.

2. Description of the Related Art

Stereoscopic viewing apparatus are used by a viewer to view two related two-dimensional images displayed on a suitable screen and thereby realize a three-dimensional effect. The related images depict the same scene, but as viewed from the perspectives of two locations spaced horizontally a distance approximating the distance between the centers of a typical viewer's eyes. The apparatus provides a three-dimensional effect by causing the viewer's left and right eyes to view the left and right displayed images, respectively. The perceived three-dimensional image has the two-dimensional proportions of the individual two-dimensional images being displayed.

One common type of stereoscopic viewing apparatus is used to view a motion picture of two related images that are projected onto a movie screen such that they overlap. In one version, the light defining the two images is polarized 90 degrees with respect to each other, and the movie screen is adapted to maintain the polarization. To separate the overlapping polarized images, the stereoscopic viewing apparatus includes appropriate polarized filters placed before the viewer's eyes. This polarization technique cannot be used with conventional television receivers, because, unlike movie screens, conventional television screens cannot display the requisite polarized images.

In another version of this common type of stereoscopic viewing apparatus, the two projected images are displayed in different colors, and the viewing apparatus separates the overlapping images using appropriately-colored filters placed before the viewer's eyes. A significant drawback to this version is that it frequently cannot display images in their true colors regardless of the type of filters used.

Another example of a prior type of stereoscopic viewing apparatus views a motion picture of two related images that are displayed on a movie screen side-by-side, rather than overlapping. The device transmits the left and right images to the left and right eyes, respectively, without the use of filters. The images could conceivably be adapted for side-by-side display on the screen of a conventional television receiver. However, for the two related images and thus the three-dimensional image to have the same two-dimensional proportions (i.e., aspect ratio) as the conventional television image, the related images cannot occupy all the available vertical dimension of the screen. Thus, this type of apparatus would be unable to utilize the television screen's entire vertical resolution capability.

Many motion pictures are filmed for display on a special wide screen. When such motion pictures are being broadcast for display on conventional television receivers or are being shown on a standard motion picture screen, the images ordinarily are cropped to eliminate portions of their left and right sides. Alternatively, the images must be boxed with black stripes along their top and bottom edges, which reduces the image's effective height. In either case, the viewing experience is diminished in quality.

It will be appreciated from the foregoing that there is a definite need for a portable stereoscopic viewing apparatus for use in viewing on a conventional television screen two side-by-side related images, using the entire vertical resolution capability of the television screen, yet providing a three-dimensional image having the two-dimensional proportions of the conventional television image. It also will be appreciated that there is a need for a viewing apparatus for use in viewing the entirety of wide-screen motion picture images on standard television screens or standard motion picture screens, using the entire screen. The present invention fulfills these needs.

SUMMARY OF THE INVENTION

The present invention is embodied in a portable viewing apparatus for providing a three-dimensional image for a viewer based on a side-by-side display of related left and right, horizontally compressed images on a display screen, such as a television screen, wherein the screen's entire vertical resolution capacity is utilized, yet the three-dimensional image is perceived to have the same two-dimensional proportions as a conventional television image. The portable viewing apparatus can also be used to view wide-screen images that are displayed, for example on a television screen, in a horizontally compressed state. The viewed images are perceived by the viewer to have the original two-dimensional proportions of the original wide-screen motion picture, yet have an apparent width substantially wider than the display screen. The apparatus is adapted to be worn on the viewer's head, allowing the viewer to move freely about, relative to the display screen, and allowing multiple viewers to view the display screen simultaneously. The apparatus is relatively simple in construction, and thus inexpensive to manufacture, and, because it further requires only a conventional television receiver for use, it is readily adapted for widespread use.

More particularly, for three-dimensional viewing, the apparatus is used in association with a display of two side-by-side, related left and right images that are each horizontally compressed by a factor of two. The apparatus includes optical path means defining left and right optical paths for transmitting the displayed left and right images to a viewer's respective left and right eyes. The apparatus further includes disanamorphic lens means located in the left and right optical paths for horizontally expanding the two images being transmitted, to restore the images to their normal two-dimensional proportions. The viewer thus realizes a three-dimensional effect with an image having normal two-dimensional proportions. This horizontal expansion can be accomplished by a separate disanamorphic lens means in the optical path for each eye.

In a more detailed feature of the three-dimensional viewing apparatus, the side-by-side related images are displayed on a conventional television receiver with each image occupying one-half of the television screen. This utilizes the entire vertical resolution capability of the television screen and provides a three-dimensional image having the screen's normal two-dimensional proportions. The displayed side-by-side, horizontally-compressed images are provided by a stereoscopic video recording played on a video player that is used in conjunction with the conventional television receiver.

In another feature of the invention, the apparatus further includes magnifying means located in the left and right optical paths, for magnifying the two images being transmitted such that the images occupy a greater portion of the viewer's field of view. An enhanced three-dimensional effect is thereby provided. This magnification can be accomplished by a separate magnifier in each of the left and right optical paths.

In another feature of the invention, the apparatus further includes means for adjusting the convergence of the left and right optical paths toward the viewer's eyes and means for adjusting the interocular spacing of the left and right optical paths at the viewer's eyes. The stereoscopic viewing apparatus is thereby adapted for use by multiple viewers.

The portable viewing apparatus alternatively can be used for effective wide screen viewing when the displayed image is just a single image that has been horizontally compressed. In this case, the convergence is adjusted such that the viewer's left and right eyes both view the single image. The disanamorphic lens means located in the left and right optical paths horizontally expands the common image being transmitted, to restore the image to its normal proportions. The viewer thus obtains a wide-screen image effect such that the entire wide-screen image effect of a motion picture can be realized on a standard television screen.

Other aspects and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 1 is a schematic representation of a viewer using a first embodiment of a portable viewing apparatus in accordance with the preferred embodiment of the present invention to view a conventional television screen displaying related side-by-side images that are each horizontally compressed and thereby receive a three-dimensional effect.

FIG. 2 is a perspective view of the portable viewing apparatus of FIG. 1.

FIG. 3 is a sectional, side elevational view of the apparatus of FIG. 2, showing the interior optical elements.

FIG. 4 is a plan view of the apparatus of FIG. 2.

DESCRIPTION OF THE PREFERRED EMBODIMENTS

Figure 5:
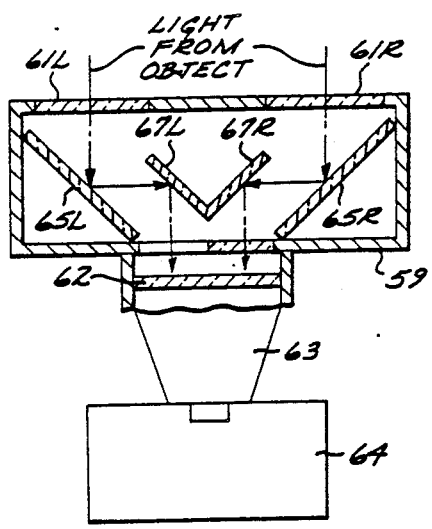
FIG. 5 is a sectional, plan view of a partial video camera lens adapted for use in producing a stereoscopic recording like that being displayed on the television screen in FIG. 1.

Referring now to the drawings, and particularly to FIG. 1, there is shown a preferred embodiment of a portable viewing apparatus 11 that is mounted on an eyeglass-type frame 13 and that is especially adapted for use by a viewer 15 to perceive a three-dimensional image while viewing two related, side-by-side, horizontally compressed images 17L and 17R displayed on a video monitor, e.g., a conventional television receiver 19. The apparatus transmits the displayed left image to the viewer's left eye and the displayed right image to the viewer's right eye. The display of the related left and right images is provided by a stereoscopic video recording that is played on a video player 21. Alternatively, the viewing apparatus 11 can be used to view a series of single images on the television monitor 19 that have been horizontally compressed. Viewing the compressed images with the viewing apparatus restores the images to expanded, wide-screen proportions.

With respect to viewing the side-by-side images 17L and 17R for three-dimensional effects, in accordance with the invention, the left and right displayed images 17L and 17R are each squeezed or compressed horizontally by a factor of two, such that together they occupy the entire screen of the television receiver 19. The apparatus includes disanamorphic lens assemblies for horizontally stretching or expanding (i.e., unsqueezing) the images being transmitted to the eyes such that the images are returned to their normal two-dimensional proportions. Thus, the viewer 15 perceives a three-dimensional image having the same aspect ratio as the entire screen. In addition, since the entire vertical length of the television screen is utilized, vertical resolution is the same as for normal two-dimensional displays.

More particularly, and as shown in FIGS. 2 and 3, the horizontal stretching is accomplished in the left optical path by a positive cylindrical lens 23L acting in conjunction with a negative cylindrical lens 25L and, in the right optical path, by a positive cylindrical lens 23R acting in conjunction with a negative cylindrical lens 25R. Because the horizontally-compressed images 17L and 17R displayed on the television screen 19 are based on images that have normal two-dimensional proportions, the horizontally-expanded, three-dimensional images will have the normal two-dimensional proportions of a conventional television image. Thus, the viewer perceives a three-dimensional image having the two-dimensional proportions that are expected to be seen when viewing a conventional television receiver.

The optical elements defining the optical path for the image 17L being transmitted to the left eye are carried within a two-part left housing 27L and a left lens assembly 29L, while in a similar fashion the optical elements defining the optical path for the image 17R being transmitted to the right eye are carried within a two-part right housing 27R and a right lens assembly 29R. The left and right housings and lens assemblies are, in turn, carried on the eyeglass-type frame 13, for convenient use by the viewer 15.

More particularly, and with reference to FIG. 2, the optical elements that define the left optical path include the positive cylindrical lens 23L and the associated negative cylindrical lens 25L, an upper mirror 31L and a lower mirror 33L, as well as a positive spherical lens 35L and an associated negative spherical lens 37L. These optical elements are located within an upper section 39L and a lower section 41L that comprise the left housing 27L, except that the negative spherical lens is located in the left lens assembly 29L. The positive cylindrical lens 23L is positioned in a vertical orientation at the top of the upper section of the left housing, to horizontally diverge the transmitted image, and the upper mirror 31L is positioned to redirect the image downwardly. The negative cylindrical lens 25L is positioned in a horizontal orientation at the bottom end of the upper section of the left housing to terminate the image's divergence, and the positive spherical lens 35L is positioned immediately adjacent to the negative cylindrical lens 25L to initiate magnification of the image. Further, the lower mirror 33L is positioned within the lower section of the left housing to redirect the image horizontally, and the negative spherical lens 37L is oriented vertically within the left lens assembly to complete the magnification of the image and direct the magnified, horizontally expanded image to the viewer's left eye.

In a similar fashion, as shown in FIGS. 2 and 3, the right optical path is defined by the positive and negative cylindrical lenses 23R and 25R, upper and lower mirrors 31R and 33R, and positive and negative spherical lenses 35R and 37R. These optical elements are arranged within the upper and lower sections 39R and 41R of the right housing 27R and the right lens assembly 29R, in the same manner as the optical elements for the left optical path are arranged in the upper and lower sections 39L and 41L of the left housing 27L and the left lens assembly 29L, as described above.

The upper and lower mirrors 31L and 33L, respectively, in the left optical path and the upper and lower mirrors 31R and 33R, respectively, in the right optical path are provided to make the apparatus 11 more compact horizontally. The compactness minimizes any tendency of the apparatus to pivot forwardly off of the viewer's head.

The apparatus 11 is preferably adapted to allow consecutive use by multiple viewers. To this end, the apparatus preferably functions to adjust for convergence, tropia, and interocular spacing. Further, the apparatus preferably is adapted to focus the magnification in the left and right optical paths.

Tropia adjustment requires adjusting the right optical path with respect to the left optical path to align the two paths vertically with the viewer's eyes. As shown in FIG. 3, this is accomplished by a set screw 43 that is threadably attached to the upper section 39R of the right housing 27R. The screw tip contacts the backside of the upper mirror 31R and, upon rotation, adjusts the angular position of the upper mirror.

Focusing is accomplished, as shown in FIGS. 2 and 3, by controllably adjusting the optical path length between the positive and negative spherical lenses 35 and 37. In the left optical path, this adjustment is accomplished by telescopically attaching the upper housing 39L to the lower housing 41L. The relative vertical positions of the upper and lower housings is controllably adjusted by a rack and pinion arrangement 45L. Similarly, in the right optical path, the upper housing 39R is telescopically attached to the lower housing 41R and their relative vertical position is controllably adjusted by a rack and pinion arrangement 45R.

Convergence adjustment involves aligning the left and right optical paths such that a viewer 15 perceives the image received by the left eye as being aligned horizontally with the image received by the right eye.

As shown in FIGS. 2 and 3, this is accomplished by controllably pivoting the left housing 27L and the right housing 27R about vertical axes.

More particularly, for the left housing 27L, the vertical axis is defined by axially-aligned lower and upper pins 47L and 49L, respectively. The lower pin pivotally attaches together the lower section 41L of the left housing 27L with a lower bracket 51L secured to a lower part of the left lens assembly 29L, and the upper pin pivotally attaches the upper section 39L of the left housing with an upper bracket 53L secured to an upper part of the left lens assembly. The left lens assembly, in turn, is attached to the eyeglass frame 13. The left housing is attached to the left lens assembly rather than directly to the frame for reasons involving interocular adjustment, as discussed further below. Controllably turning a knob 55L at the upper end of the upper pin 49L pivots the entire left housing, with the optical elements it carries, relative to the left lens assembly and the eyeglass frame. To accommodate focusing, the upper pin and upper bracket allow the upper section of the left housing to move vertically relative to them.

In a similar fashion, for the right housing 27R, the vertical axis is defined by axially-aligned lower and upper pins 47R and 49R, respectively. The lower pin pivotally attaches the lower section 41R of the right housing 27R with a lower bracket 51R secured to a lower part of the right lens assembly 29R, and the upper pin pivotally attaches the upper section 39R of the right housing with an upper bracket 53R secured to an upper part of the right lens assembly. The right lens assembly, in turn, is attached to the eyeglass frame 13, as discussed further below. A knob 55R at the upper end of the upper pin pivots the entire right housing relative to the eyeglass frame. These elements are substantially identical in structure and function to the corresponding elements for the left housing 27L and the left lens assembly 29L.

Interocular spacing involves adjusting the spacing of the left and right optical paths adjacent to the viewer's left and right eyes. As shown in FIGS. 2 and 3, this is accomplished by slidably attaching the left and right lens assemblies 29L and 29R to the eyeglass frame 13, and adjusting the spacing between the lens assemblies, thereby adjusting the spacing between the left and right negative spherical lenses 37L and 37R. Despite this sliding movement of the lens assemblies, the elements in the left and right optical paths remain aligned since the left and right housings 27L and 27R are attached by pins and brackets to the respective left and right lens assemblies. Adjusting interocular spacing is accomplished by a left rack and pinion arrangement 57L that controllably positions the left lens assembly within the eyeglass frame, and by a right rack and pinion arrangement 57R that controllably positions the right lens assembly within the eyeglass frame.

The mirrors 31L, 31R, 33L and 33R are flat and preferably reflective on their front surfaces to preclude the refraction of incident light and thereby prevent the creation of double images. To reduce interference from spurious light, the interior surfaces of the housings 27L and 27R preferably are black.

As previously mentioned with respect to obtaining a three-dimensional viewing effect, and as shown in FIG. 1, the stereoscopic recording is played on a conventional video player 21 to produce on a conventional television receiver 19 a display of two side-by-side, horizontally compressed, related images 17L and 17R.

The stereoscopic recording consists of a conventional video tape and a video signal, recorded on the video tape by a conventional video recorder, that embodies the requisite display of images.

The recorded video signal preferably is produced by using a video camera to view an object through a camera lens specially adapted to provide two related, side-by-side images of the object. As shown in FIG. 5, a three-dimensional assembly 59 provides the left and right related images by receiving light from the object through a left and a right aperture 61L and 61R that are horizontally spaced apart a distance approximating the distance between the centers of a typical viewer's eyes. Light from the object that passes through the mirror is then directed to an anamorphic lens system shown schematically at 62, for horizontal compression by a factor of two, and then to a conventional camera lens and camera, shown schematically at 63 and 64, respectively. An adjustable adapter (not shown) is used to couple the mirror assembly and anamorphic lens to the camera lens and camera.

The three-dimensional mirror assembly 59 includes left and right first mirrors 65L and 65R, and left and right second mirrors 67L and 67R. The light through the left aperture is reflected by the left first mirror laterally toward the left second mirror. The left second mirror reflects the received light toward the anamorphic lens. In a similar manner, the light through the right aperture is reflected by the right first mirror towards the right second mirror, and then towards the anamorphic lens. The mirrors 65L, 65R, 67R and 67R are flat and preferably reflective on their front surfaces to preclude the refraction of incident light and thereby prevent the creation of double images.

As previously mentioned with respect to obtaining a wide-screen viewing effect, and with reference to FIG. 1, the video player 21 is used to display a single horizontally compressed image on the conventional television receiver 19. The video signal preferably is produced using a video camera to view wide-screen motion picture images through a camera lens specially adapted to provide the horizontally compressed images. The video camera lens of FIG. 5, With the three-dimensional mirror assembly 59 removed, but with the anamorphic lens 62 retained, advantageously can be used for this function. The anamorphic lens compresses the wide-screen image by whatever factor is desired, depending on the relative aspect ratio of the original wide screen image, and directs the compressed image to a conventional camera lens and camera, shown schematically at 63 and 64, respectively. When the compressed images are then viewed using the portable viewing apparatus 11, the viewer will observe the restored, horizontally expanded images and obtain a wide-screen viewing effect on a standard television receiver 19.

Figure 6:
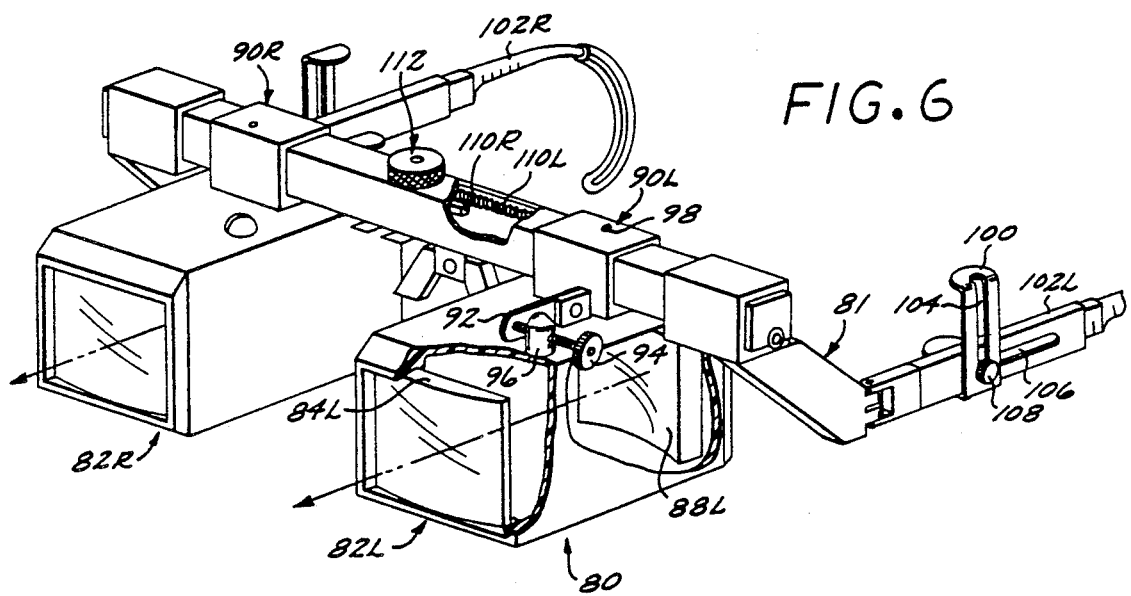
FIG. 6 is a perspective view of a second embodiment of a portable viewing apparatus in accordance with the invention, this embodiment eliminating the magnifying lens of the embodiment of FIG. 1.

As shown in FIG. 6, a simplified, portable viewing apparatus 80 can be used in place of the apparatus 11 shown in FIG. 1 for selectively providing either a three-dimensional image or a wide-angle image, as described above. The viewing apparatus includes left and right optical housings 82L and 82R. The housings provide straight line optical paths such that no mirrors are necessary to direct the viewed images to the viewer's eyes. The internal construction of the left optical housing will be described in greater detail, with the understanding that a similar construction applies to the right housing.

The left optical housing 82L includes an objective lens comprising a positive cylindrical lens 84L to horizontally diverge the viewed image and an associated negative spherical lens 88L to complete the horizontal expansion and direct the horizontally expanded image to the viewer's left eye. A magnifying lens (not shown) may optionally be included to provide enhanced three-dimensional and wide-screen viewing effects.

The viewing apparatus 80 includes means for adjusting for convergence and interocular spacing. As noted above, convergence adjustment involves aligning the left and right optical paths so that a viewer 15 perceives the image received by the left eye as being aligned horizontally with the image received by the right eye. In particular, if the apparatus is being used for stereoscopic viewing of left and right images 17L and 17R (FIG. 1), than the convergence is adjusted so the viewer's left eye views the left image 17L and the viewer's right eye views the right image 17R. Alternatively, if the apparatus is being used to view the single image for wide-screen viewing, the convergence is adjusted so both of the viewer's eyes see the single image.

As shown in FIG. 6, convergence adjustment is accomplished by controllably pivoting the left housing 82L with respect to the right housing 82R about a vertical axis. In particular, the left housing is suspended from the eyeglass frame 81 by a bracket 90L. A tab 92 projects from the forward face of the bracket and bears against the end of a set screw 94 that is threaded through a bracket 96 placed on the top surface of the left housing 82L. As the set screw is rotated, the end of the set screw bears against the projecting tab and causes the left housing 82L to rotate about the vertical axis defined by the mounting bracket 90L. The left housing 82L can be mounted, for example, to the eyeglass frame 81 by a pivot pin 98.

The viewing apparatus 80 of FIG. 6 further includes structure for adapting its attachment to any eyeglasses (not shown) the viewer might be wearing. In particular, an adjustable bracket 100 projects upwardly from a left temple 107L of the frame 81. An inward bend at the bracket's upper end is configured to hook onto the left temple of the eyeglasses. A slot 104 in the bracket and a slot in the temple 106 cooperate with a screw 108 to allow a vertical and horizontal adjustment of the bracket and thereby adapt to different eyeglasses. Similar adjustments ar provided for the right temple 102R.

Interocular spacing involves adjusting the spacing of the left and right optical paths adjacent to the viewer's left and right eyes. As shown in FIG. 6, this can be accomplished by adjusting the spacing between the left optical housing 82L and the right optical housing 82R. The adjustment is accomplished by providing a toothed rack 110L attached to the left optical housing 82L and attaching a toothed rack 110R to the right optical housing 82R. A toothed wheel assembly 112 is provided to move the rack portions 110L and 110R relative to each other. As shown in greater detail in FIG. 7, a thumb wheel 114 can be rotated, which rotates a gear wheel 116. Because the gear wheel is in meshing engagement with the toothed racks, the racks are moved relative to each other, which moves the optical housings 82L and 82R relative to each other. This movement changes the interocular spacing.

Figure 7:
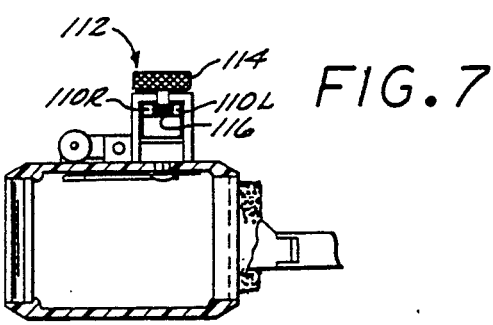
FIG. 7 is a sectional, side elevational view of the apparatus of FIG. 6.

It will be noted that the embodiment of FIGS. 6 and 7 provides a fixed focus. Variable focusing could be provided by adapting the lenses 82L and 88L and the lenses 82R and 88R to be controllably movable relative to each other.

It should be appreciated from the foregoing description that the present invention provides a portable optical viewing apparatus for providing a three-dimensional image for a viewer based on a side-by-side display on a conventional video screen of related left and right images that are each horizontally compressed, and for providing a wide-screen image for a viewer based on a display of a single horizontally compressed image on a conventional video screen. In providing a three-dimensional image, the apparatus transmits the displayed left image to the viewer's left eye and displayed right image to the viewer's right eye, while horizontally expanding the compressed images and returning them to their original proportions. The displayed side-by-side images span the screen's entire vertical length, such that a three-dimensional effect is provided having the two-dimensional proportions of the conventional video image. In its alternative use of providing a wide-screen image, the apparatus transmits a single horizontally expanded image that has been restored to its original proportions.

The viewing apparatus of the invention is lightweight, so it can be worn comfortable on a viewer's head. In addition, many viewers can each use their own viewing apparatus and thereby simultaneously view the same program material.

Although the invention has been described in detail with reference to presently preferred embodiments, it should be understood by those with ordinary skill in the art that various modifications can be made without departing from the invention. Accordingly, the invention is defined only by the appended claims.

We claim:

1. Portable viewing apparatus for use by a viewer in an enhanced visual effect when viewing displayed images that are horizontally compressed relative to their normal proportions, providing, the apparatus comprising:
    optical path means defining left and right optical paths for transmitting the displayed image to a viewer's left and right eyes, wherein the optical path means includes convergence means for selectively adjusting the convergence of the left and right optical paths toward the viewer's respective left and right eyes, and wherein the defined optical paths are free of any optical occluders, filters, or polarizers and are free of any wedge lenses for modifying the vertical positions of the images;
    disanamorphic lens means located in the left and right optical paths, for horizontally expanding the images being transmitted along the optical paths to the viewer's left and right eyes such that the images are restored to their normal two-dimensional proportions; and
    means for carrying the optical path means and disanamorphic lens means in predetermined positions on the viewer's head, to allow the viewer to move independently relative to the displayed images and to selectively operate the means for adjusting convergence as the need arises;
    wherein the viewer is enabled to perceive the displayed images in their normal two-dimensional proportions, with an enhanced visual effect.

2. Portable viewing apparatus as defined in claim 1, and further comprising magnifying means located in the left and right optical paths, for magnifying the images being transmitted along the optical paths to the viewer's respective left and right eyes, such that the eyes receive the images in a magnified form.

3. Portable viewing apparatus as defined in claim 2, wherein:
    the disanamorphic lens means includes separate lenses for horizontally expanding the left and right images; and
    the magnifying means includes separate 4. Portable viewing apparatus as defined in claim 1, wherein the optical path means includes:
    means for selectively adjusting the interocular spacing of the left and right optical paths at the viewer's left and right eyes;
    whereby the stereoscopic viewing apparatus is adapted for use by multiple viewers.

5. Portable viewing apparatus as defined in claim 1, wherein:
    the apparatus is used by the viewer to view by-side display of related left and right images that are each horizontally compressed; and
    the convergence means is adjusted such that the left optical path transmits the left image display to the viewer's left eye and the right optical path transmits the right image display to the viewer's right eye, whereby the viewer perceives a three-dimensional image.

6. Portable viewing apparatus as defined in claim 5, wherein:
    the side-by-side display of related left and right images is provided by a conventional video screen, and the two images each occupy one-half of the screen; and
    the disanamorphic lens means horizontally expands the left and right images such that each image is restored to the two-dimensional proportions of the full video screen.

7. Portable viewing apparatus as defined in claim 1, wherein:
    the apparatus is used by the viewer to view a display of a single image that is horizontally compressed; and
    the convergence means is adjusted such that
    the left and right optical paths both transmit the same single image display to the viewer's left and right. eyes, respectively, whereby the viewer perceives an image having a width greater than that of the displayed image.

8. Portable viewing apparatus for providing expanded images for a viewer that are based on a display on a conventional television screen of horizontally compressed images, the apparatus comprising:
    optical path means defining left and right optical paths for transmitting the displayed images to a viewer's respective left and right eyes, wherein the defined optical paths are free of any optical occluders, filters, or polarizers and are free of any wedge lenses for modifying the vertical positions of the images, wherein the optical path means include
    means for selectively adjusting the convergence of the left and right optical paths toward the viewer's respective left and right eyes, whereby the apparatus is usable at a range of distances from the screen, and
    means for selectively adjusting the interocular spacing of the left and right optical paths at the viewer's left and right eyes, whereby the apparatus is adapted for use by multiple viewers;
    disanamorphic lens means including separate lenses located in the left and right optical paths, for horizontally expanding the respective left and right images being transmitted along the optical paths to the viewer's respective left and right eyes such that the viewed images are restored to their normal two-dimensional proportions; and a frame for carrying the optical path means and disanamorphic lens means in predetermined positions on the viewer's head, to allow the viewer to move independently relative to the displayed images;

wherein the viewer is enabled to perceive an image in its normal two-dimensional proportions regardless of the viewer's range from, or position relative to, the screen.

9. A portable viewing apparatus as defined in claim 8, wherein:

the conventional television screen is used to display related left and right images that are each horizontally compressed, each image occupying about one-half of the screen; and the convergence means is adjusted such that the left optical path transmits the displayed left image to the viewer's left eye and the displayed right image to the viewer's right eye, whereby the viewer perceives a three-dimensional image.

10. A portable viewing apparatus as defined in claim 8, wherein:

the conventional television screen is used to display a single image that is compressed horizontally, but fills substantially the entire screen; and the convergence means is adjusted such that the left and right optical paths both transmit the displayed single image to the viewer's left and right eyes, respectively, whereby the viewer perceives a wide-angle image having a width greater than that of the displayed image.

11. A portable viewing apparatus as defined in claim 8, further including magnifying means, including separate lenses located in the left and right optical paths, for magnifying the images being transmitted along the optical paths to the viewer's respective left and right eyes, such that the eyes receive the images in a magnified form.

* * * * *

UNITED STATES PATENT AND TRADEMARK OFFICE
CERTIFICATE OF CORRECTION

PATENT NO. :  5,124,840
DATED       :  June 23, 1992
INVENTOR(S) :  Trumbull et al.

It is certified that error appears in the above-identified patent and that said Letters Patent is hereby corrected as shown below:

In column 7, line 43, change "With" to --with--.

In column 10, line 6, after "separate" insert --lenses for magnifying the left and right images--.

In column 10, line 16, after "view" insert --a side--.

Signed and Sealed this

Twenty-first Day of September, 1993

Attest:

BRUCE LEHMAN

Attesting Officer

Commissioner of Patents and Trademarks